(12) United States Patent
Barry

(10) Patent No.: US 9,815,227 B2
(45) Date of Patent: Nov. 14, 2017

(54) MEDIA CONTAINMENT FOR ISO-GRID STRUCTURE FORMING

(71) Applicant: United Technologies Corporation, Hartford, CT (US)

(72) Inventor: Thomas M. Barry, East Hampton, CT (US)

(73) Assignee: UNITED TECHNOLOGIES CORPORATION, Hartford, CT (US)

( * ) Notice: Subject to any disclaimer, the term of this patent is extended or adjusted under 35 U.S.C. 154(b) by 413 days.

(21) Appl. No.: 14/577,584

(22) Filed: Dec. 19, 2014

(65) Prior Publication Data

US 2015/0190949 A1 Jul. 9, 2015

Related U.S. Application Data

(60) Provisional application No. 61/924,580, filed on Jan. 7, 2014.

(51) Int. Cl.

| B32B 3/10 | (2006.01) |
|---|---|
| B29C 39/10 | (2006.01) |
| B29C 39/36 | (2006.01) |
| B32B 3/12 | (2006.01) |
| B21D 47/00 | (2006.01) |
| B32B 27/08 | (2006.01) |
| B32B 27/16 | (2006.01) |
| B32B 27/20 | (2006.01) |
| B32B 27/38 | (2006.01) |
| B29L 31/60 | (2006.01) |

(52) U.S. Cl.
CPC .............. *B29C 39/10* (2013.01); *B21D 47/00* (2013.01); *B29C 39/36* (2013.01); *B32B 3/12* (2013.01); *B32B 27/08* (2013.01); *B32B 27/16* (2013.01); *B32B 27/20* (2013.01); *B32B 27/38* (2013.01); *B29L 2031/60* (2013.01); *B32B 2605/18* (2013.01); *Y10T 428/24777* (2015.01)

(58) Field of Classification Search
None
See application file for complete search history.

(56) References Cited

U.S. PATENT DOCUMENTS

| 3,940,891 | A * | 3/1976 | Slysh | B64G 9/00 244/119 |
|---|---|---|---|---|
| 4,012,549 | A * | 3/1977 | Slysh | B64C 1/08 244/119 |
| 6,261,395 | B1 * | 7/2001 | Duffy | B29C 31/08 156/154 |
| 8,257,600 | B2 * | 9/2012 | Raji | B44C 1/227 156/345.11 |
| 8,919,696 | B2 * | 12/2014 | Lonsdorfer | B29C 70/30 244/117 R |
| 2004/0025338 | A1 * | 2/2004 | Green | B23Q 3/086 29/888 |
| 2004/0055349 | A1 * | 3/2004 | El-Soudani | B21D 26/08 72/56 |

* cited by examiner

*Primary Examiner* — Christopher Polley
(74) *Attorney, Agent, or Firm* — Snell & Wilmer L.L.P.

(57) ABSTRACT

A method of forming an iso-grid structure may include filling multiple pockets of the iso-grid structure with a filler material, attaching a support structure to the perimeter of the iso-grid structure, shaping the iso-grid and support structures, and removing the support structure from the iso-grid structure. The support structure may be thinned and stretched during the shaping process.

13 Claims, 4 Drawing Sheets

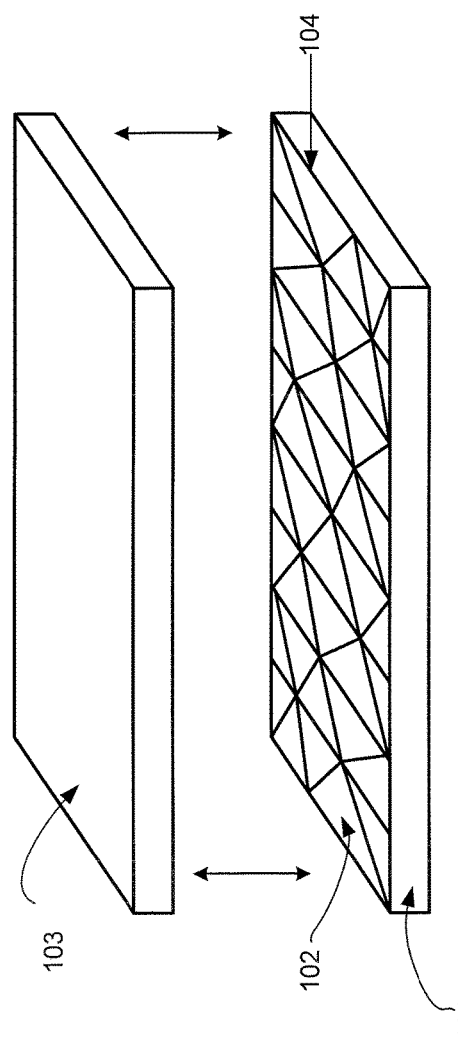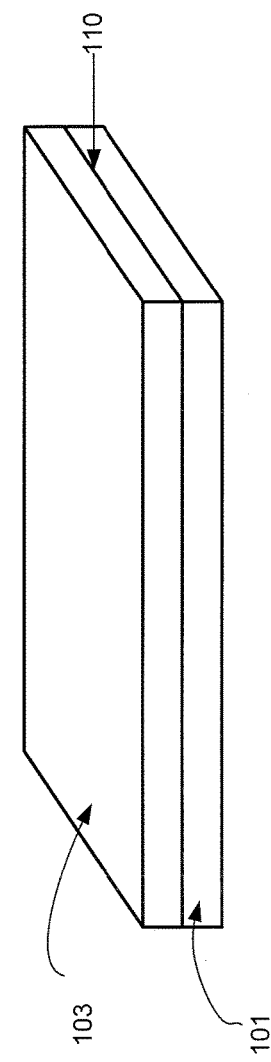

MEDIA CONTAINMENT FOR ISO-GRID STRUCTURE FORMING

CROSS-REFERENCE TO RELATED APPLICATIONS

This application is a nonprovisional of, and claims priority to, and the benefit of U.S. Provisional Application No. 61/924,580, entitled "MEDIA CONTAINMENT FOR ISO-GRID STRUCTURE FORMING," filed on Jan. 7, 2014, which is hereby incorporated by reference in its entirety.

FIELD

The present disclosure relates generally to sheet metal forming. More particularly, the present disclosure relates to a system and method of forming iso-grid sheet metal using a secondary sheet.

BACKGROUND

Various aerospace components are manufactured with an iso-grid pattern. These patterns are generally produced through post-form chemical milling. In other instances, some success has been attained through machining the iso-grid pattern in a flat material and then forming post-machining. Typically, a filler material in the iso-grid pattern may be used to prevent pocket buckling during the forming process. A stiffer filler material is generally applied for more extreme forms. However, a stiffer filler material also creates a greater opportunity for the filler to crack and liberate during the forming process. Supporting sheets of material stock can be used to assist in retaining material and often are pinned near the center of the part. However, this center attachment does not ensure intimate contact of the supporting sheet and iso-grid pattern throughout the forming operation, which often leads to liberation of the filler material.

SUMMARY

In various embodiments, a method of forming an iso-grid structure may include filling multiple pockets of the iso-grid structure with a filler material, attaching a support structure to the perimeter of the iso-grid structure, shaping the iso-grid and support structures, and removing the support structure from the iso-grid structure. The support structure may be thinned and stretched during the shaping process.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

FIG. 1A illustrates an exploded view of iso-grid and support structures in accordance with various embodiments;

FIG. 1B illustrates a perspective view of iso-grid and support structures in accordance with various embodiments;

DETAILED DESCRIPTION

Figure 2:
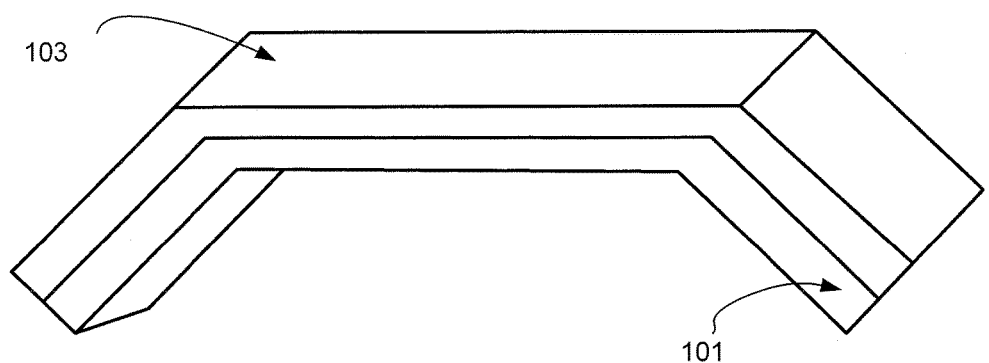
FIG. 2 illustrates formed iso-grid and support structures in accordance with various embodiments.
Figure 3:
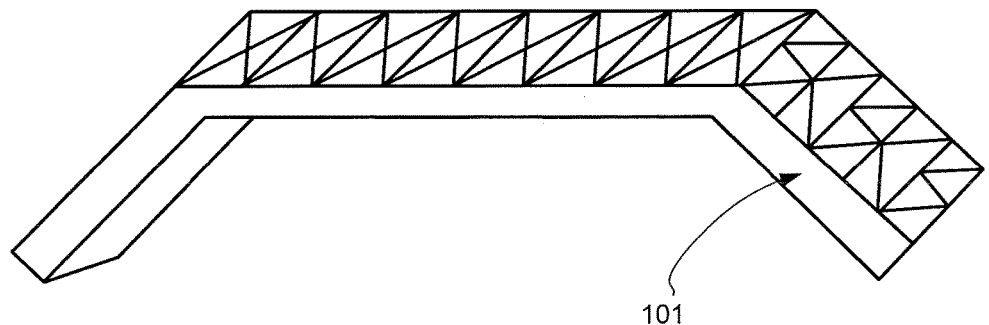
FIG. 3 illustrates a formed iso-grid structure in accordance with various embodiments.

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, material, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

An iso-grid structure may refer to a structure comprising a pattern of ribs, such as ribs that form triangular or rectangular shapes, which increase the stiffness of the structure while reducing the weight. Iso-grid structures may be used in applications that use thin-walled components to enhance structural integrity, such as in gas turbine engines. The application of an iso-grid structure to a thin-walled component may allow for improved structural integrity without the added weight of a thicker wall. Iso-grid structures can be formed into desired shapes. In various embodiments, a flat material can be machined into an iso-grid structure and the iso-grid structure can be formed into a desired shape. In order to help maintain the structural integrity of the iso-grid pattern during the forming process, a filler material can fill the pockets of the iso-grid structure. The filler material may be, for example, a curable resin such as an epoxy resin, or an Indalloy. Furthermore, the filler material can range from softer, wax-based filler to harder, lead-based filler, such as an Indalloy alloy. The filler material provides support to the iso-grid pattern during the forming process. The filler material may have different hardness levels, with harder filler materials offering more support but having higher likelihood of breaking away from a pocket of the iso-grid structure. The harder materials are less ductile and may be more likely to hold shape compared to softer materials.

In accordance with various embodiments and with reference to FIGS. 1A and 1B, an iso-grid structure 101 may have a filler material located in the pockets 102 of the iso-grid pattern, and the iso-grid structure 101 can be attached to a support structure 103. As shown in FIGS. 1A and 1B, support structure 103 can be attached to the face 104 of iso-grid structure 101 having the pockets 102, thereby providing support to the filler material. In various embodiments, iso-grid structure 101 can have two support structures attached, one on either side of the iso-grid structure. In various embodiments, both iso-grid structure 101 and support structure 103 are flat, or substantially flat, at the time the two structures are being attached. In further embodiments, iso-grid structure 101 is in a pre-formed, non-flat shape when attached to support structure 103, and support structure 103 has a pre-form, non-flat shape to complement iso-grid structure 101.

In accordance with various embodiments, an exemplary method of forming the shape of iso-grid structure 101 may comprise attaching support structure 103 at the perimeter of iso-grid structure 101. Iso-grid structure 101 may be attached to support structure 103 using an attachment coupling 110. In various embodiments, attachment coupling 110 may include welding, brazing, mechanically fastening (clamps, screws, and the like) and any other suitable method of attached the two structures. As previously mentioned, both iso-grid structure 101 and support structure 103 are typically flat at the time of attachment to each other at the perimeters. In various embodiments, the iso-grid structure and the support structure are attached at the respective perimeters. In one variation, the edges of the iso-grid structure and support structure are substantially flush such that the perimeters of the iso-grid structure and support structure are substantially the same. In various embodiments, the edge of the iso-grid structure and/or the support structure can extend past the edge of the other structure. In such embodiments, the edge of the shorter structure may be attached to the overlapping structure at the point of overlap. As used herein, the perimeter of a structure may refer to the outer edge or proximate the outer edge.

Furthermore, in various embodiments, the attachment at the perimeter may include attachment at the entire perimeter of one the structures. In various embodiments, attachment at the perimeter may include attachment at portions of the perimeter. For example, the iso-grid structure and the support structure may be attached at 50% or more of the perimeter edge. The partial perimeter attachment may occur at opposite edges of the structures. The partial perimeter attachment may also occur at multiple attachment points that have unattached portions in between.

Moreover, the attached iso-grid and support structures can be shaped or formed in a variety of ways, including using rollers, male/female forming dies, and other methods as would be known to one skilled in the art. In accordance with various embodiments and with reference to FIG. 2, as the attached iso-grid structure 101 and support structure 103 are bent and shaped, the support structure 103 may stretch and thin during the forming process. In various embodiments, the support structure 103 maintains an attachment to the iso-grid structure 101, thereby providing support to keep the filler material in the pockets of the iso-grid structure 101. Accordingly, providing more support to the iso-grid structure during the forming process can facilitate producing more extreme forming profiles compared to prior art ranges. Stated another way, the forming process of machining the iso-grid structure and then forming using a support structure may allow for an tighter radius of curvature, and can allow for the use of harder filler in comparison to prior art methods. In the prior art, bending an iso-grid structure into a small radius of curvature is more likely to experience cracking, thinning beyond allowances, and/or wrinkling due to the material not flowing during the forming process. In various embodiments, a support structure coupled to the iso-grid structure and supporting the filler material may facilitate forming a smaller radius of curvature in the iso-grid structure without, or to a lesser degree, the drawbacks just mentioned. The harder filler material provides more support to the iso-grid pockets during the forming process and reduces the amount of deformities occurring in the iso-grid pattern.

Figure 5:
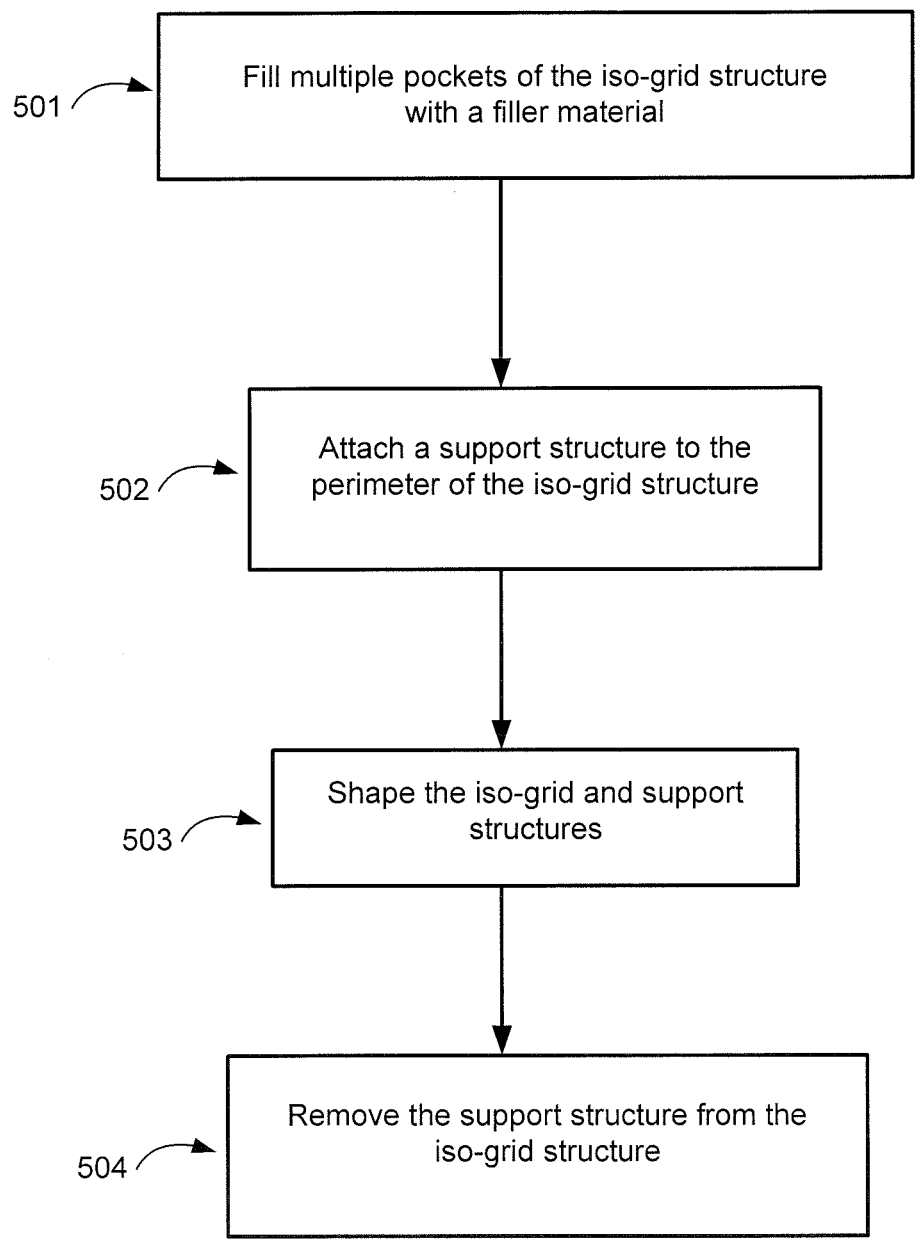
FIG. 5 is a flowchart of an exemplary method of forming an iso-grid structure in accordance with various embodiments.

Furthermore, various embodiments and with reference to FIG. 5, a method of forming an iso-grid structure may comprise filling multiple pockets of the iso-grid structure with a filler material 501, attaching a support structure to the perimeter of the iso-grid structure 502, shaping the iso-grid and support structures, wherein the support structure is thinned and stretched during the shaping 503, and removing the support structure from the iso-grid structure 504. After the attached iso-grid and support structures are formed to a final position, the edges can be removed (i.e., cut-off), thereby separating the iso-grid structure 101 and the support structure 403, and leaving the iso-grid structure 101 in its desired form. The support structure can be discarded after it has been removed. Since the support structure can be discarded, the material of support structure can be the least expensive material that is suitable for the forming process. For example, suitable materials include stainless steel and steel.

Figure 4A:
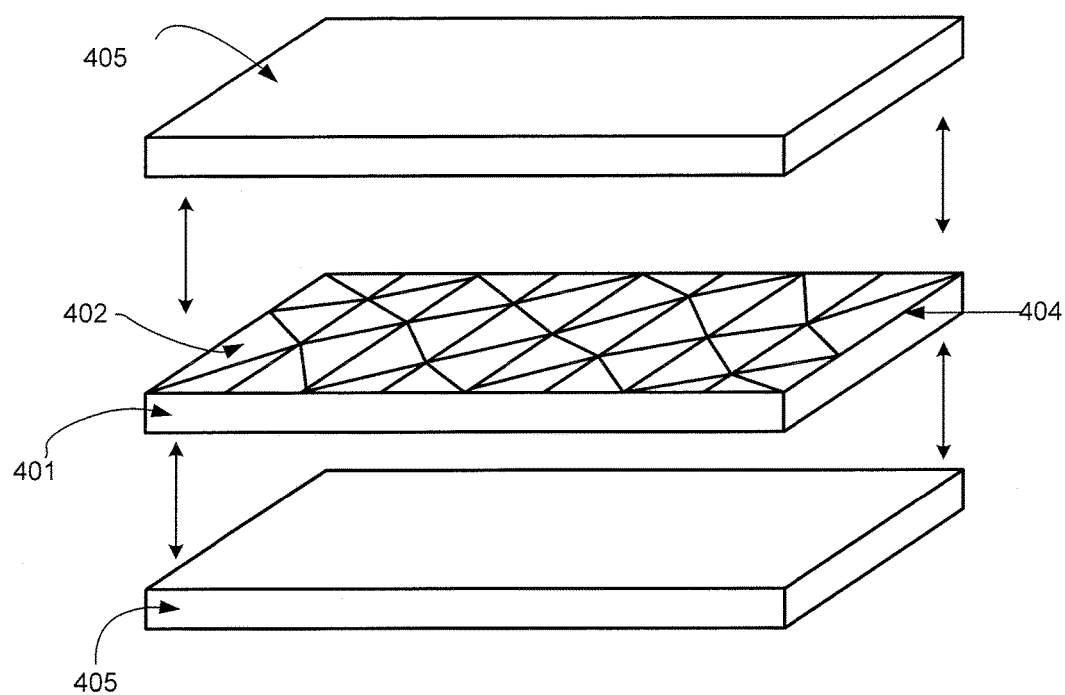
FIG. 4A illustrates an exploded view of iso-grid and two support structures in accordance with various embodiments.
Figure 4B:
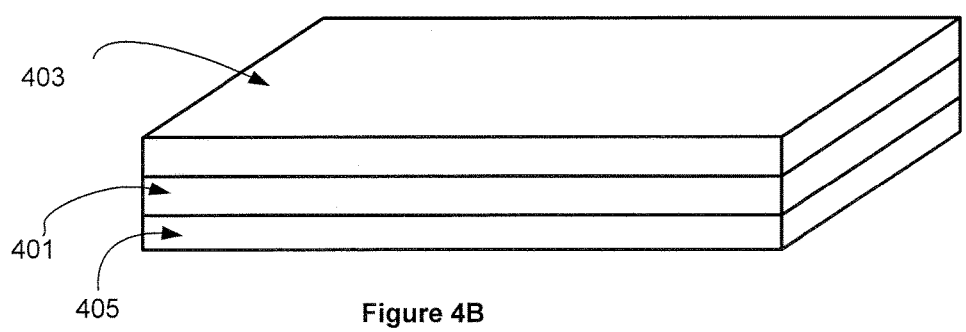
FIG. 4B illustrates a perspective view of iso-grid and two support structures in accordance with various embodiments.

In accordance with various embodiments and with reference to FIGS. 4A and 4B, iso-grid structure forming system may comprise an iso-grid structure 401 may have a filler material located in the pockets 402 of the iso-grid pattern, and the iso-grid structure 401 may be attached to a first support structure 403 and a second support structure 405. As shown in FIGS. 4A and 4B, first support structure 403 may be attached to the face 404 of iso-grid structure 401 having the pockets 402, thereby providing support to the filler material, and second support structure 405 may be attached to the opposite face of iso-grid structure 401. In various embodiments, iso-grid structure 401, first support structure 403, and second support structure 405 are flat, or substantially flat, at the time the three structures are being attached.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method of forming an iso-grid structure, the method comprising:
    filling multiple pockets of the iso-grid structure with a filler material;
    attaching a support structure to the perimeter of the iso-grid structure;
    shaping the iso-grid and support structures, wherein the support structure is thinned and stretched during the shaping; and
    removing the support structure from the iso-grid structure.

2. The method of claim 1, wherein the iso-grid structure has a face having multiple pockets, and the support structure is attached to the face of the iso-grid structure.

3. The method of claim 1, further comprising attaching a second support structure to the iso-grid structure, wherein the second support structure is attached to a face of iso-grid structure opposite the support structure.

4. The method of claim 1, wherein both the iso-grid structure and the support structure are substantially flat during the attaching.

5. The method of claim 1, wherein the filler material is a curable resin.

6. The method of claim 1, wherein the support structure is attached to the iso-grid structure using at least one of welding, brazing, or mechanically fastening.

7. The method of claim 1, wherein the support structure is attached to the entire perimeter of the iso-grid structure.

8. The method of claim 1, wherein the support structure is attached to a portion of the perimeter of the iso-grid structure.

9. The method of claim 8, wherein the support structure is attached to at least 50% of the perimeter of the iso-grid structure.

10. The method of claim 8, wherein the support structure is attached on opposite edges of the perimeter of the iso-grid structure.

11. The method of claim 8, wherein the support structure is attached at multiple attachment points of the perimeter of the iso-grid structure.

12. The method of claim 1, wherein the shaping comprises an application of at least one of rollers and male/female forming dies.

13. The method of claim 1, wherein the removing the support structure from the iso-grid structure comprises cutting off the edges of the iso-grid and support structures.

* * * * *